May 29, 1951     J. W. LEIGHTON     2,555,141
INDEPENDENT WHEEL SUSPENSION AND SWAY CONTROL

Filed Dec. 6, 1944     2 Sheets-Sheet 1

INVENTOR.
John W. Leighton.
BY
Harness, Dickey & Pierce
ATTORNEYS.

May 29, 1951     J. W. LEIGHTON     2,555,141
INDEPENDENT WHEEL SUSPENSION AND SWAY CONTROL

Filed Dec. 6, 1944     2 Sheets-Sheet 2

INVENTOR.
John W. Leighton.
BY
Harness, Dickey & Pierce.
ATTORNEYS.

Patented May 29, 1951

2,555,141

UNITED STATES PATENT OFFICE 2,555,141

INDEPENDENT WHEEL SUSPENSION AND SWAY CONTROL

John W. Leighton, Port Huron, Mich.

Application December 6, 1944, Serial No. 566,869

11 Claims. (Cl. 267—11)

The invention relates generally to automobiles and particularly to sway or roll controlling devices and their effect on the riding qualities of motor vehicles.

When low rated springs were first used with independently sprung wheels excellent riding qualities were obtained and objectionable noises were lessened, but later when sway or roll control devices were added to the front end suspensions, additional spring values were added by them to the car springs. The result was an increase in the over-all rate of the suspension springs and consequently a detrimental effect to the good ride.

The spring values of such sway devices now in use are of sizeable proportions and since they do not operate at all to prevent front end dip when brakes are applied and likewise they do not operate to help springs to resist striking bottom when both wheels hit sizeable obstructions on the road, the car springs have had to be increased to prevent these things from happening. The spring rate of these devices, however, when added to the already increased rated car springs, results in a combination of high rated springs when the wheels operate independently of each other as they do during normal road driving, and as a consequence a hard ride is obtained with a resultant increase in noise within the car.

The present invention provides an antisway device which generally includes a spring element having a spring value operating in conjunction with the car springs at all times i. e. when brakes are applied, when both wheels hit sizeable obstructions and when the car wheels move upwardly and downwardly independently of one another. Moreover this device has an entirely different and independent method of sway or roll control because its spring value under normal riding conditions is not used to resist roll or sway actions.

One object of the invention therefore is to provide an antisway device co-operating with the wheel suspensions to obtain a comfortable, smooth ride under the usual road and driving conditions.

Another object of the present invention is to provide an improved means for preventing undesirable swaying of the vehicle frame or body which at the same time will have substantially no adverse influence with respect to the quality of the ride that could be otherwise obtained.

Another object of the present invention is to provide an improved means for preventing undesirable swaying of the vehicle frame which can be manufactured and assembled at substantially less expense while still obtaining highly satisfactory results so as to enable reduction in cost of the vehicle.

Other objects of the invention will become apparent from the following specification, from the drawings relating thereto, and from the claims hereinafter set forth.

For a better understanding of the invention reference may be had to the drawings wherein.

Figure 1:
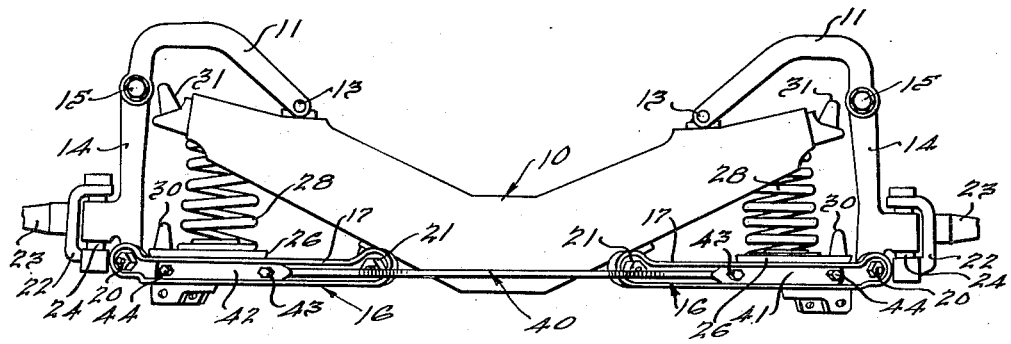
Figure 1 is a front elevational view of a vehicle frame embodying oppositely disposed wheel suspensions connected by sway preventing means constructed according to one form of the invention.

Referring to Fig. 1 the frame of the vehicle is indicated at 10 and it should be understood that the frame may be of an ordinary type having side members extending longitudinally of the vehicle and rear and front cross members. The portion of the frame shown in Fig. 1 may be considered generally as the front cross member of the frame.

Figure 2:
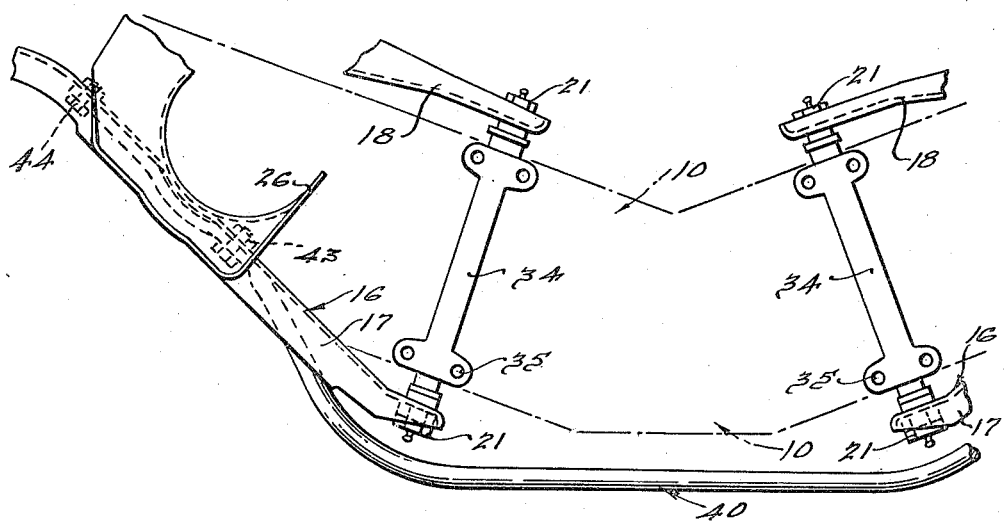
Fig. 2 is a fragmentary plan view of the construction shown by Fig. 1.

Each of the individual wheel suspensions comprises an upper arm 11 which is pivotally connected to the frame by means indicated at 13, and pivotally connected to a vertically disposed wheel supporting member 14 by pivotal means indicated at 15. The lower arm of the suspension is indicated at 16 and as best shown by Fig. 2 comprises a pair of arms 17 and 18. These arms at their outer ends are pivotally connected as indicated at 20 to the lower end of the wheel supporting member 14 while the inner ends of the arm are pivotally connected as indicated generally at 21 to the underside of the frame cross member. A wheel supporting knuckle 22 and a wheel axle 23 thereon are connected to the wheel supporting member 14 by a vertically disposed king pin indicated at 24 so that the wheel may swing about the axis of the king pin.

Between the end of the cross frame member and a pan 26 on the lower arm 16, a coil supporting spring 28 is provided so that the frame is supported by the spring, and the spring in turn is supported by the arm. A rubber bumper 30 is provided on the outer end of the lower arm 16 for engagement with the end of the frame so as to limit relative movement of the arm and frame in one direction, while a similar bumper 31 is provided on the upper side of the frame for engagement with arm 11 so as to limit a reverse relative movement of the frame and arms.

The suspension shown in Fig. 1 may be substantially like that shown in applicant's Patent 2,321,832, and it should be understood in connection with this patent that the pivotal connections 13 and 21 may comprise control bars such as indicated at 34 in Fig. 2, and that the arms have threaded pivotal connections with the ends of these bars. The bars in turn are connected to the cross frame member by fastening means indicated at 35. The pivotal connections 15 and 20 likewise may correspond to those shown in applicant's prior patent, and from this it follows that swinging of the arms can occur about the pivotal connections 13 and 21, and that likewise the wheel supporting member 14 and arms are hingedly connected by the pivotal means 15 and 20. The opposite wheel suspension is identical to the suspension described and therefore it is unnecessary to describe it here. The present invention comprises generally the connecting of the two suspensions by sway preventing means.

The sway preventing means comprises a resilient metal bar 40 extending transversely of the vehicle and having widened, flattened ends 41 and 42, each of which is connected to the adjacent lower control arm 16 of the wheel suspension by means of bolts 43 and 44. It will be observed that the end portions of the bar lie within the channel construction of the two lower arms of the suspensions and that the bar is curved forwardly past the front ends of the control bars or pivots 21, and that the intermediate portion of the bar is substantially straight in a lateral direction between the pivots 21 and in front of the frame cross member. This resilient bar is constructed of steel stock heat treated to obtain the desired resiliency or spring characteristics.

Figure 3:
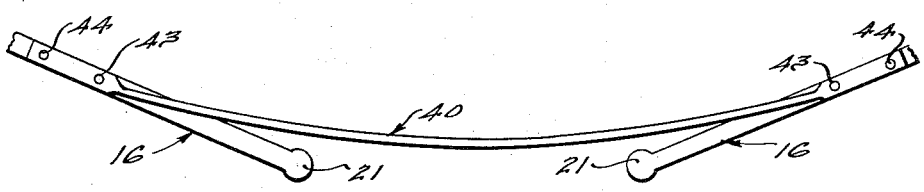
Fig. 3 is a diagrammatic view illustrating movements of the spring wheel suspensions and antisway device when both wheels move vertically with respect to the frame at the same time.

Now referring to Fig. 3, it may be pointed out that if both wheels are lifted or elevated when the vehicle is running along the road in a straight line, as for instance when both wheels engage an obstruction in the road at the same time, the bar 40 is free to bend over its entire length between the connections 43 and that the central portion of the bar is free to move vertically past the pivot points 21 and past the frame member. Likewise if both wheels should engage a depression in the road at the same time so that they both would be lowered simultaneously, the control arms 16 would swing downwardly and during this movement, the resilient bar would be free to bend over its entire length between the connections 43 while the intermediate portion of the bar would be free to move vertically with respect to the frame or body. A similar action occurs when the brakes are applied suddenly in which event the front end of the frame tends to dip. When any of these conditions occur, the resilient bar 40 resists downward or upward movement of the frame, and for small relative movements of the frame and wheels its resistance is slight, whereas with any increase in the relative movements the resistance of the bar will increase rapidly due to increased bending of the bar.

Figure 4:
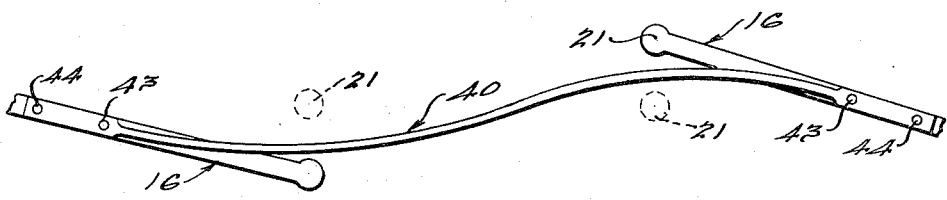
Fig. 4 illustrates movement of the wheel suspensions and antisway device when the frame or body of the vehicle tends to roll laterally in one direction; and, Fig. 5 is a similar diagrammatic view illustrating movement of the parts when one wheel alone moves vertically.

When the direction of the vehicle is changed or turned from that of a straight line direction, the body and frame tend to roll, and this action tends to elevate pivotal point 21 at the inside of the turn and to lower the pivotal point 21 at the outside of the turn. When this condition occurs as has been illustrated diagrammatically in Fig. 4, the resilient bar 40 does not bend in one direction throughout its length as occurs in the case as considered in connection with Fig. 3. Instead the control arms 16 at opposite sides of the car will tend to bend the bar 40 in opposite directions so that the central portion of the bar does not move upwardly or downwardly in a free manner as mentioned previously. The difference in effect can be readily visualized if one considers first the action that occurs when one firmly grips the ends of a bar with the hands and moves both ends upwardly by a turn of the hands, and the action that occurs when the ends are gripped firmly but one end is bent upwardly and the other is bent downwardly by a turn of the hands. In effect the resilient bar in the case considered in connection with Fig. 4, becomes rigid and most strongly acts against the tendency of the body to roll or sway laterally in that it strongly acts to prevent vertical separation of the two pivotal points 21. Therefore instead of the pivot points moving from dotted position 21 to the vertically separated full line positions shown as would be the situation if the frame excessively rolled or tilted, the pivot points are strongly held against such wide separation and substantially remain in the dotted line positions.

Figure 5:
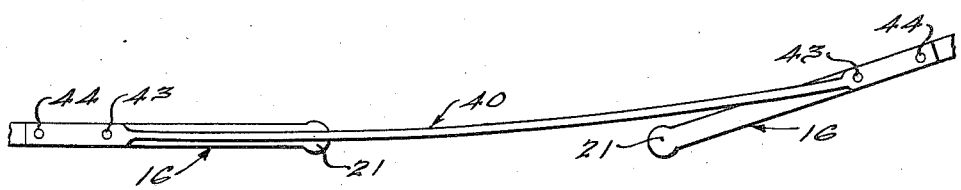

Fig. 5 illustrates a condition which may occur where one wheel strikes an obstacle and moves upwardly. The coil spring at that side of course compresses and the bar bends substantially as in Fig. 3. If the wheel struck a depression, the action would be about the same but in an opposite direction. In this case also, the bar would resist small relative movements but slightly while its resistance would increase rapidly for larger movements.

From the foregoing it should be clear that the resilient bar 40 acts in conjunction with the coil springs to absorb vertical movement of the wheels when they strike obstructions or depressions simultaneously or separately or when the front end of the frame tends to dip due to sudden application of the brakes. Where such relative movements of the frame and wheels are small, the bar has practically no spring resistance to the movement but this resistance increases rapidly as the relative movement increases. It should be realized also that where the vehicle makes a turn, the resilient bar acts strongly to prevent rolling or swaying of the frame due to the fact that the bar must be bent in opposite directions from its ends. Finally it will be appreciated that in the normal operation of the car over relatively smooth straight roads, the car will have the desirable soft riding qaulities due to the fact that the springs in the suspensions can be designed to give a constant and desirable spring rate since the slight spring effect of the bar for small relative movement of the frame and wheels can be considered as part of the suspension spring in view of the fact it operates with it and in the same direction at all times.

Although only one form of the invention has been illustrated and described in detail, it will be apparent to those skilled in the art that various modifications may be made without departing from the scope of the claims.

What is claimed is:

1. In combination, a vehicle frame, an individual wheel suspension at each side of the frame and each including a laterally extending arm pivoted to the frame for swinging movement about a substantially horizontal axis extending longitudinally of the frame, and a resilient bar extending laterally of the frame and having its end portions connected to said arms respectively, said bar being attached only to the arms at positions spaced from the points of pivotal connection of the frame and arms and being free from controlling connection with other parts of the vehicle.

2. In combination, a vehicle frame, an individual wheel suspension at each side of the frame and each including a laterally extending arm pivoted to the frame for swinging movement about a substantially horizontal axis extending longitudinally of the frame, and a resilient bar extending laterally of the frame, the end portions of the bar having a substantially rigid connection to the arms respectively so that such end portions remain substantially fixed in position on the arms during movement of the latter about their pivots, said bar being attached only to the arms and being free from controlling connection with other parts of the vehicle.

3. In combination, a vehicle frame, an individual wheel suspension at each side of the frame and each including a laterally extending arm pivoted to the frame for swinging movement about a substantially horizontal axis extending longitudinally of the frame, a resilient bar extending laterally of the frame and having end portions of substantial length extending along the respective arms, and fasteners for rigidly connecting each of said end portions to its arm at a position spaced from the pivot of the arm so that such end portion remains substantially in fixed position relative to the arm as the latter swings about its pivot, said bar being attached only to the arms and being free from controlling connection with other parts of the vehicle.

4. In combination, a vehicle frame, an individual wheel suspension at each side of the frame and each including a laterally extending arm pivoted to the frame for swinging movement about a substantially horizontal axis extending longitudinally of the frame, a resilient bar extending laterally of and independently of the frame and having substantially straight end portions disposed on the arms respectively, and fasteners for rigidly connecting the end portions to such arms at points spaced from the pivots thereof so that such end portions have substantially fixed positions on the arms, said bar being attached only to the arms and being free from controlling connection with other parts of the vehicle, an intermediate portion of the bar between the end portions being arcuate in form.

5. In combination, a vehicle frame, an individual wheel suspension at each side of the frame and each including a laterally extending arm pivoted to the frame for swinging movement about a substantially horizontal axis extending longitudinally of the frame, a resilient bar extending laterally of the frame and having its ends connected to the arms respectively, with each connection spaced from the pivot and located between the pivot and outer end of the arm, the bar between the connections being free from any controlling connection with other parts of the vehicle.

6. In combination, a vehicle frame, an individual wheel suspension at each side of the frame and each including a laterally extending arm pivoted to the frame for swinging movement about a substantially horizontal axis extending longitudinally of the vehicle, a resiliently bendable bar extending laterally of the frame and having end portions substantially rigidly connected to the arms respectively with each end of the bar connected to its arm at a location between the arm pivot and the outer end of the arm, the bar between said connections being free from any controlling connection with other parts of the vehicle.

7. In combination, a vehicle frame, an individual wheel suspension at each side of the frame and each including a laterally extending arm pivoted to the frame for swinging movement about a substantially horizontal axis extending longitudinally of the vehicle, a resiliently bendable bar extending laterally of the frame and having end portions extending along and substantially parallel to the arms respectively, and means substantially rigidly connecting each end portion of the bar to its arm between the arm pivot and outer end of the arm so that each end portion of the bar acts substantially as a fixed part of the arm, the bar being free from controlling connection with other parts of the vehicle.

8. An antisway device for use in connection with opposite individual wheel suspensions wherein each suspension includes an arm pivoted to the frame for up and down swinging movement about an axis directed longitudinally of the frame, comprising a resiliently bendable bar having an intermediate base portion and end portions bent towards the same side of the bar and at an obtuse angle with relation to such base portion, each end portion being bent intermediate its ends in a direction reverse to the first bend where it joins the base portion and terminating beyond said reverse bend in an attachment portion provided with a plurality of longitudinally spaced fastening portions for rigidly attaching it to the suspension arm.

9. In combination, a vehicle frame, an individual wheel suspension at each side of the frame and including a laterally extending arm hinged at its inner end to the frame for pivotal movement about an axis extending longitudinally of the frame, a spring-like, resilient metal bar extending laterally of the frame and having substantial linear portions at its ends lying along the arms respectively between the inner and outer ends thereof and rigidly connected thereto, said bar being curved between said end portions and being of sufficient length and size as to prevent overstressing of the bar at any point through bending caused by movement of the arms during operation of the vehicle.

10. In combination, a vehicle frame, an individual wheel suspension at each side of the frame and including a laterally extending arm hinged at its inner end to the frame for pivotal movement about an axis extending longitudinally of the frame, a spring-like, resilient metal bar extending laterally of the frame and having substantial linear portions at its ends lying along the arms respectively between the inner and outer ends thereof and rigidly connected thereto, said bar being bent intermediate said end portions and reversely bent adjacent said end portions, with each longitudinal half of the intermediate portion of the bar between said end portions being substantially identical in configuration to the other half, the intermediate portion of the bar being of sufficient length and size as to prevent overstressing of the bar at any point through bending caused by movement of the arms during operation of the vehicle.

11. In combination, a vehicle frame, an individual wheel suspension at each side of the frame and including a laterally extending arm hinged at its inner end to the frame for pivotal movement about an axis extending longitudinally of the frame, a spring-like, resilient metal bar extending laterally of the frame and having substantial linear portions at its ends lying along the arms respectively between the inner and outer ends thereof and rigidly connected thereto, said bar being of sufficient length and size as to prevent overstressing of the bar at any point through bending caused by movement of the arms during operation of the vehicle.

JOHN W. LEIGHTON.

REFERENCES CITED

The following references are of record in the file of this patent:

UNITED STATES PATENTS

| Number | Name | Date |
|---|---|---|
| 1,742,387 | Gatter | Jan. 7, 1930 |
| 2,096,969 | Lemay | Oct. 26, 1937 |
| 2,201,250 | Utz | May 21, 1940 |
| 2,254,261 | Best | Sept. 2, 1941 |
| 2,254,325 | Slack et al. | Sept. 2, 1941 |
| 2,263,107 | Smirl | Nov. 18, 1941 |
| 2,344,072 | Winkelmann | Mar. 14, 1944 |
| 2,351,651 | Wulff | June 20, 1944 |
| 2,442,282 | Utz | May 28, 1948 |
| 2,471,135 | Wyeth | May 24, 1949 |